United States Patent
Kunishima et al.

[11] Patent Number: 5,130,927
[45] Date of Patent: Jul. 14, 1992

[54] VEHICLE HEIGHT CONTROL DEVICE ADAPTED FOR SELF STOPPING IN FAULT OPERATION AND RESTARTING

[75] Inventors: Kazutoshi Kunishima; Hidemori Tsuka, both of Toyota; Masanori Hirose, Okazaki, all of Japan

[73] Assignee: Toyota Jidosha Kabushiki Kaisha, Toyota, Japan

[21] Appl. No.: 521,568

[22] Filed: May 10, 1990

[30] Foreign Application Priority Data

May 12, 1989 [JP] Japan .................................. 1-119402

[51] Int. Cl.$^5$ .............................................. B60G 17/00
[52] U.S. Cl. .................. 364/424.05; 280/707
[58] Field of Search ................. 364/424.01, 424.05; 280/707, 6.1, 840

[56] References Cited

U.S. PATENT DOCUMENTS

| | | | |
|---|---|---|---|
| 4,714,272 | 12/1987 | Buma et al. | 280/707 |
| 4,787,644 | 11/1988 | Yokote et al. | 280/6 R |
| 4,803,630 | 2/1989 | Takizawa et al. | 364/424.05 |
| 4,821,191 | 4/1989 | Ikemoto et al. | 364/424.1 |
| 4,936,604 | 6/1990 | Kawagoe et al. | 280/840 |
| 4,939,655 | 7/1990 | Majeed et al. | 364/424.05 |
| 4,948,166 | 8/1990 | Kaneko | 280/707 |
| 4,965,878 | 10/1990 | Yamagiwa et al. | 364/424.05 |

FOREIGN PATENT DOCUMENTS

| | | |
|---|---|---|
| 0217356 | 4/1987 | European Pat. Off. |
| 58-49507 | 3/1983 | Japan |
| 61-21808 | 1/1986 | Japan |
| 62-94413 | 4/1987 | Japan |
| 62-96109 | 5/1987 | Japan |

Primary Examiner—Thomas G. Black
Attorney, Agent, or Firm—Cushman, Darby & Cushman

[57] ABSTRACT

A vehicle height control device stops the operation of vehicle height adjustment if the vehicle height at a wheel can not be increased to a target value during a height increasing operation within a predetermined time period. Automatic restoration of vehicle height adjustment occurs after a predetermined period if the vehicle height has increased to a height greater than a threshold value. However, if such a detection is not made, vehicle height adjustment is locked up.

6 Claims, 4 Drawing Sheets

FIG. 4

| VEHICLE HEIGHT | DETECTION LEVEL | TARGET HEIGHT MEDIUM | TARGET HEIGHT HIGH | TARGET HEIGHT LOW |
|---|---|---|---|---|
| HIGH | 15 | TOO HIGH | TOO HIGH | TOO HIGH |
| | 14 | TOO HIGH | TOO HIGH | TOO HIGH |
| | 13 | TOO HIGH | TARGET REGION | TOO HIGH |
| | 12 | TOO HIGH | TARGET REGION | TOO HIGH |
| | 11 | TOO HIGH | TARGET REGION | TOO HIGH |
| | 10 | TOO HIGH | TARGET REGION | TOO HIGH |
| | 9 | TARGET REGION | TOO LOW | TOO HIGH |
| | 8 | TARGET REGION | TOO LOW | TOO HIGH |
| | 7 | TARGET REGION | TOO LOW | TOO HIGH |
| | 6 | TARGET REGION | TOO LOW | TOO HIGH |
| | 5 | TOO LOW | TOO LOW | TARGET REGION |
| | 4 | TOO LOW | TOO LOW | TARGET REGION |
| | 3 | TOO LOW | TOO LOW | TARGET REGION |
| | 2 | TOO LOW | TOO LOW | TARGET REGION |
| | 1 | TOO LOW | TOO LOW | TOO LOW |
| LOW | 0 | TOO LOW | TOO LOW | TOO LOW |

VEHICLE HEIGHT CONTROL DEVICE ADAPTED FOR SELF STOPPING IN FAULT OPERATION AND RESTARTING

BACKGROUND OF THE INVENTION

1. Field of the Invention

The present invention relates to a vehicle height adjustment device which automatically adjusts the height of the vehicle relative to the wheels to a target value, and more particularly, to a vehicle height adjustment device which automatically terminates its vehicle height adjustment operation when an abnormal operation occurs, and restarts its operation when the cause of the abnormal operation disappears.

2. Description of the Prior Art

Vehicle height adjustment devices have been developed with the ability to terminate the operation thereof, and adjustment in response to an abnormal operation thereof, and restart the operation when the cause of the abnormal operation has disappeared, as is described, for example, in Japanese Patent Laid Open Publication Sho 58-49507 (1983).

This technology has a logic circuit which stops the operation of vehicle height adjustment when a target vehicle height is not attained even after the vehicle height adjustment device has been operated for a certain period, and thereafter restarts the device if and when the target vehicle height is attained.

Generally, however, abnormal operations in the vehicle height adjustment device are either due to faults in the device itself, or abnormalities in the conditions under which it is being used. Abnormalities in the conditions of use include for example cases where the vehicle is overloaded, or is on extremely uneven ground. In this case, after a temporary operation failure, it is desirable that when the normal operation conditions have been restored for the operation of vehicle height adjustment, the control device is automatically restarted. On the other hand, it is not desirable that the control device be restarted if the cause of the operation failure has not yet been removed.

In the above-mentioned prior art, when the operation was terminated because the target vehicle height was not attained even though the system had been operated for a certain predetermined period, if the target vehicle height is attained thereafter even for a moment, for any reason whatsoever, the operation of the system will be immediately restarted.

Therefore, if the vehicle is still overloaded or there is a fault in the device itself that it has terminated operation, and the vehicle body bounds slightly, then the system operation will be restarted. Since the system has been spuriously restarted, there still remains a heavy load on the device or other system failure (such as leakage) which lead to further failures.

SUMMARY OF THE INVENTION

The object of the present invention is to provide a vehicle height adjustment device which has an automatically restarting function but will not restart its operation as a result of a false decision on the trouble.

According to the present invention, the above-mentioned object is accomplished by a vehicle height adjustment device comprising:

an actuator disposed between a vehicle body and a vehicle wheel capable of raising and lowering the body relative to the wheel for adjusting vehicle height according as pressurized fluid is supplied thereto and exhausted therefrom, respectively;

a fluid supply and exhaust means for selectively supplying pressurized fluid to said actuator or exhausting pressurized fluid from said actuator;

a vehicle height detection means for detecting the vehicle height of the body relative to the wheel; and an operation control means which activates said fluid supply and exhausting means so as to supply pressurized fluid to said actuator when the vehicle height detected by said vehicle height detection means is lower than a first target value therefor and to exhaust pressurized fluid from said actuator when the vehicle height detected by said vehicle height detection means is higher than a second target value therefor, wherein said operation control means stops the operation of said fluid supply and exhaust means when after a certain period the vehicle height detected by said vehicle height detection means does not reach a third target value therefor, but restarts the operation of said fluid supply and exhaust means when the vehicle height detected by said vehicle height detection means is higher than a certain threshold value determined therefor to be substantially higher than said third target value.

By the vehicle height control device of the above-mentioned construction, once the operation has been stopped temporarily, the device is not restarted as long as the vehicle height is not detected higher than a particular value which is substantially higher than the target value at which the control operation was stopped. Therefore, as compared with the conventional device, the possibility of erroneously restarting operation even though the cause of the fault operation has not yet disappeared is very substantially reduced. Further, since the vehicle height will substantially increase if the cause of the fault operation has disappeared, the fact that the operation can be restarted will not be overlooked because of detecting if the vehicle height has increased beyond such a threshold value. Further, the condition for restarting the vehicle height adjustment operation can be adjusted to an actual condition at which the vehicle height adjustment operation is really required.

According to an embodiment of the present invention, the vehicle height adjustment device may be constructed so even though the supply and exhaust means is operated to supply pressurized fluid to said actuator for the certain period, the vehicle height detected by the vehicle height detection means does not reach the third target value.

Further, the vehicle height adjustment device according to the present invention may be constructed so that the vehicle height detected by said vehicle height detection means is higher than said threshold value. The vehicle height determined with respect to the wheel for which vehicle height increasing process has been executed the largest number of times over the certain period therefor.

Still further, the vehicle height adjustment device according to the present invention may be constructed so that the operation control means restarts the operation of the fluid supply and exhaust means when the vehicle height detected by said vehicle height detection means is higher than the threshold value determined therefor which is substantially higher than the third target value.

Still further, the vehicle height adjustment device according to the present invention may be constructed so that the operation control means restarts the operation of the fluid supply and exhaust means when a predetermined period has elapsed from the stopping of the operation thereof.

BRIEF DESCRIPTION OF THE DRAWINGS

In the accompanying drawings,

FIG. 4 is a diagrammatic illustration of a vehicle height detection means incorporated in the vehicle height control device according to the present invention.

DESCRIPTION OF THE PREFERRED EMBODIMENT

The present invention will be described in more detail with respect to a preferred embodiment thereof with reference to the accompanying drawings.

Figure 1:
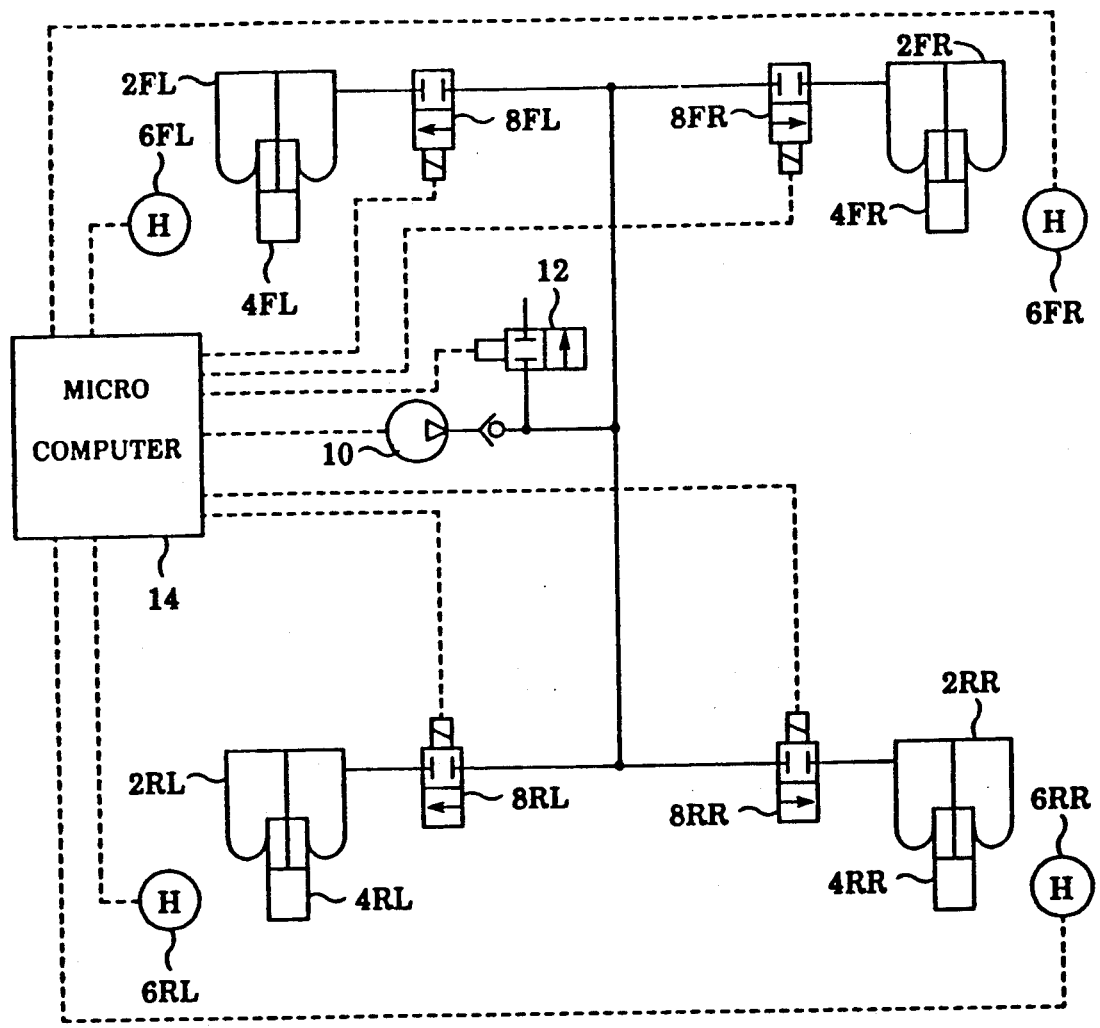
FIG. 1 is a diagrammatic illustration of a vehicle height adjustment device in which the present invention is incorporated.

Referring to FIG. 1 showing particularly the flow of pressurized fluid, in which FL refers to the front left wheel, FR refers to the front right wheel, RL refers to the rear left wheel, and RR refers to the rear right wheel, pneumatic cylinders 2 and shock absorbers 4 are each attached between a vehicle body and wheels, not particularly shown in the figure, in a conventional manner. The pneumatic cylinders 2 are actuators which expand to increase the vehicle height when pressurized fluid is supplied thereto, and thus vary the vehicle height of the vehicle body relative to a wheel at respective positions.

Each pneumatic cylinder 2 is connected with a common compressor 10 by a fluid passage incorporating therein a height control valve 8. An exhaust valve 12 is connected to a part of the fluid passage common to all pneumatic cylinders. The valves 8 and 12 are switchable between open and closed states.

When the compressor 10 is operated with the exhaust valve 12 being closed, then compressed air is supplied to any one of the pneumatic cylinders 2 for which the height control valve 8 is opened. The vehicle height is then increased at those wheels whose control valve 8 is open. When any one of the height control valves 8 is opened with the exhaust valve 12 also open and the compressor being stopped, then the compressed air is exhausted from the corresponding pneumatic cylinder 2. If the height control valves 8 are closed, then vehicle height adjustment will not be carried out. Of course the pneumatic cylinders 2FL, 2FR, 2RL, and 2RR are not all simultaneously supplied with or exhausted of compressed air, but are controlled in order; such as from the vehicle wheel which is furthest from the target vehicle height.

Vehicle height sensors 6 are provided to detect vehicle height at each vehicle wheel position. The vehicle height data detected are input to a microcomputer 14 which based on the data outputs control signals to the compressor 10, the height control valves 8, and the exhaust valve 12 to attain the target vehicle height. In FIG. 1, solid lines denote fluid passages, and broken lines denote signal and electric power cables.

Figure 2:
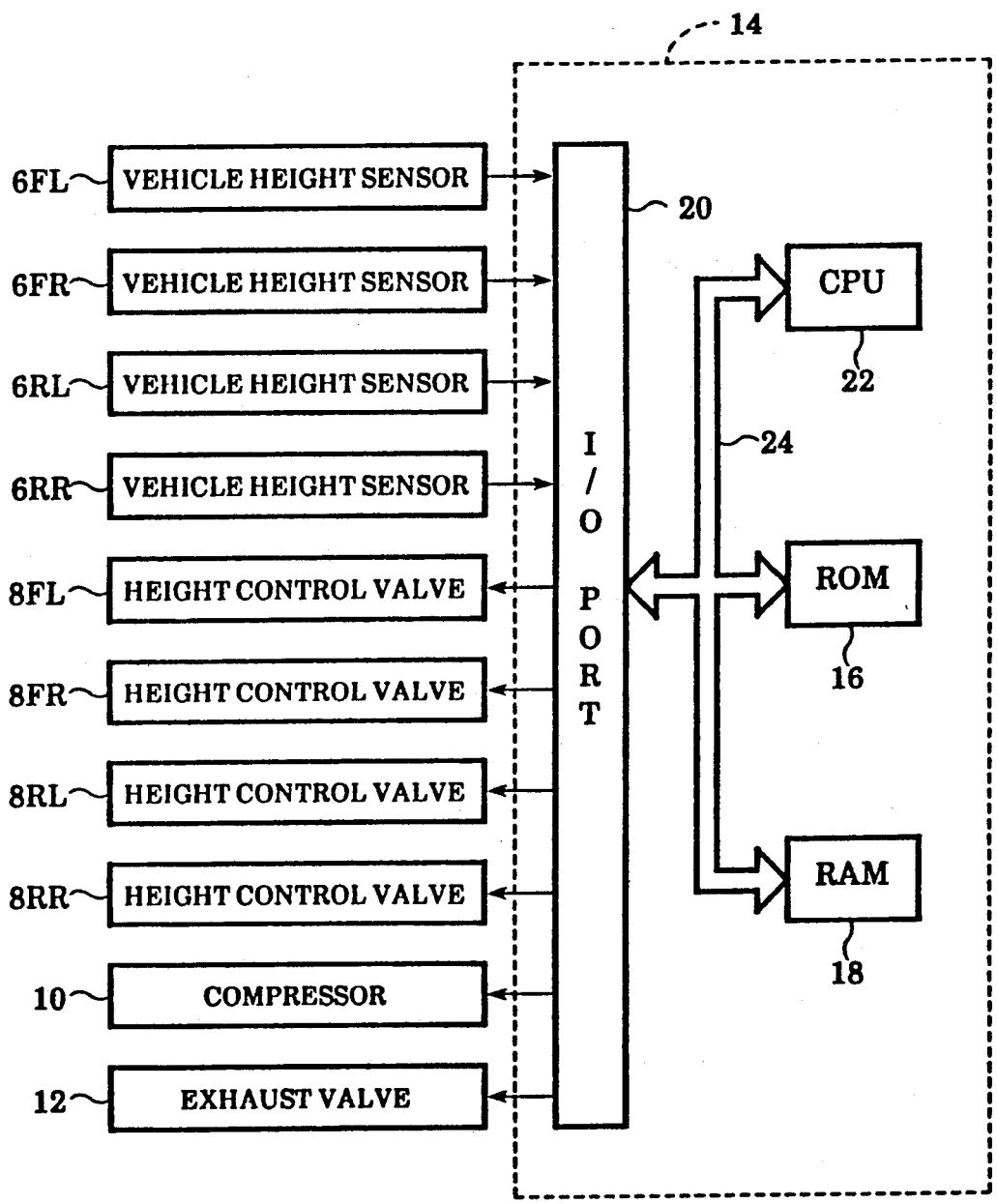
FIG. 2 is a diagrammatic illustration of the operation control means in the vehicle height control device according to the present invention.

FIG. 2 shows the internal organization of the microcomputer 14, and related devices connected thereto. The principal constituents of the microcomputer 14 are a central processing unit (CPU) 22, a read only memory (ROM) 16, a random access memory (RAM) 18 and an input/output interface (I/O port) 20, these being interconnected by common bus 24. The signals from the vehicle height sensors 6FL, 6FR, 6RL, and 6RR are read into the CPU 22 through the I/O port 20. The CPU 22 carries out a calculation by using the RAM 18 according to programs stored in the ROM 16. The CPU 22 then outputs control signals, based on the calculation results, through the I/O port 20 the height control valves 8FL, 8FR, 8RL and 8RR, to the motor 10, and the exhaust valve 12. In FIG. 2, arrows indicate the direction of flow of the input and output signals.

The vehicle height sensors used here are shown in Toyota Crown New Model Handbook pages 7-33 and 7-34 (Published Sep. 1, 1987 by Toyota Jidosha Kabushiki Kaisha), and as shown in FIG. 4 detect the vehicle height as one of 16 levels, from 0, the lowest level, to 15, the highest level.

The target vehicle height can be switched among these settings, high, medium and low. For example, as shown in FIG. 4, "medium" is set to correspond to a range from level 6 to level 9.

When the target vehicle height is set to "medium", if a vehicle height of 5 or less level is detected for at least a certain proportion in a certain period, then the means vehicle height is lower than the target vehicle height. The air supply means is than actuated to increase the vehicle height. Increasing the vehicle height is continued until the vehicle height is detected as at least level 6 for at least a certain proportion in a certain period. Supplying or exhausting air is performed according to a certain proportion over a certain period, in order to avoid rapidly repeated on/off operations and adjust the mean vehicle height to the target vehicle height.

Figure 3:
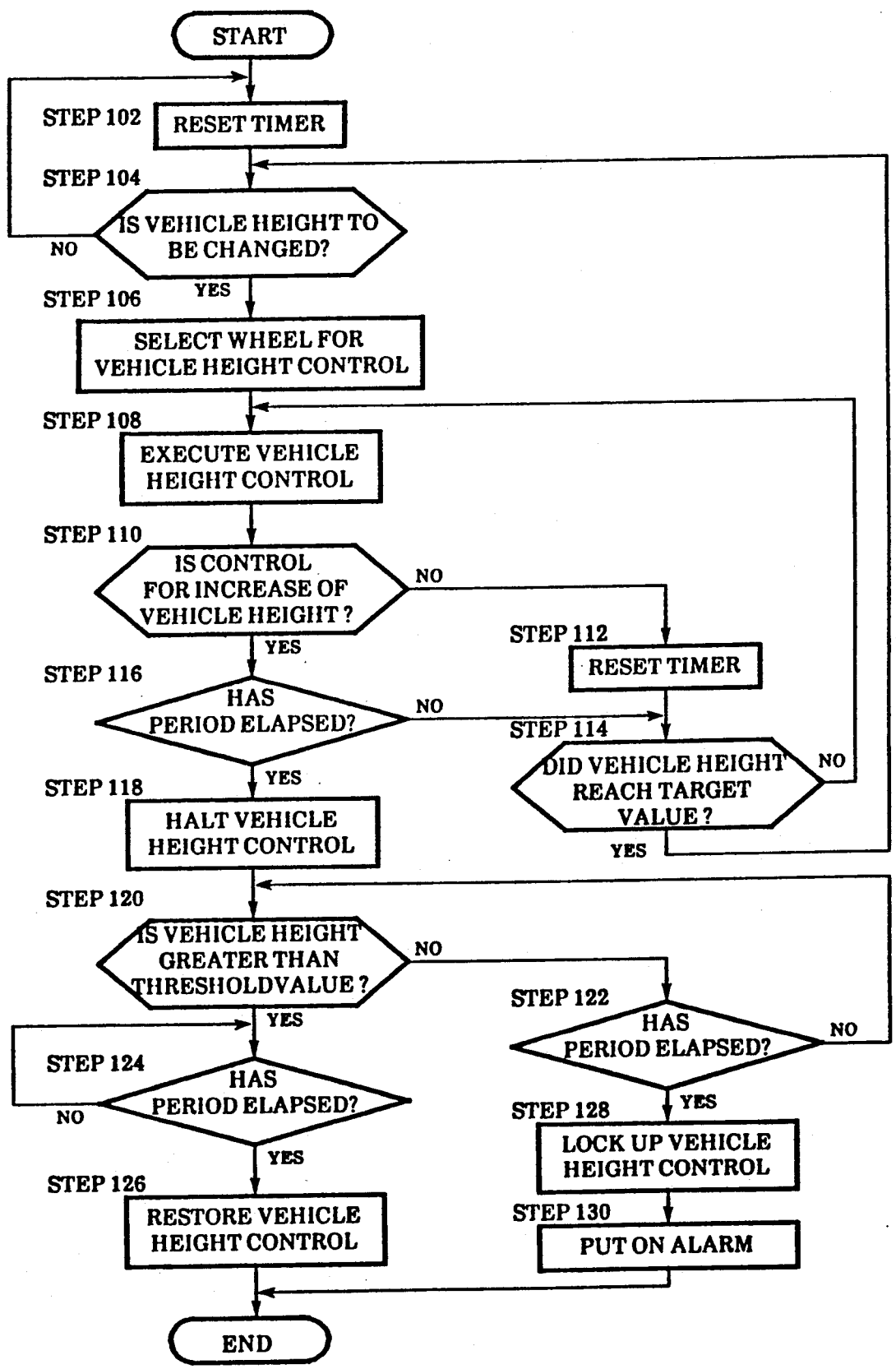
FIG. 3 is a flowchart showing the processing sequence implemented by the operation control means.

FIG. 3 shows the processing sequence which carries out vehicle height adjustment control (as described above) termination of operation in the event of a fault, monitoring the disappearance of the fault, and a restarting operation. Since the processing sequence for vehicle height adjustment control is described above is not directly related to the present invention, detailed descriptions of the sequence of processing are herein omitted. This processing is executed by a part of the program stored in the ROM 16.

First, in step 102, a time counter built into the microcomputer 14 is initialized to zero. In step 104, a test is made as to whether or not there is any vehicle wheel for which conditions hold such that for the vehicle height adjustment control compressed air should be supplied to or exhausted from the pneumatic cylinder 2 for the vehicle wheel. As described above, this test is not simply made by reference to the vehicle height detected by the vehicle height sensor 6 at that moment, but by reference to the frequency of occurrence of such a condition over a certain period. Next, in step 106, the particular vehicle wheel, i.e. the front left wheel, the front right wheel or the rear wheels are selected for the vehicle height adjustment to be carried out, and in step 108 control of the pressure in the pneumatic cylinder 2 for the selected wheel or wheels is carried out. It should be noted that in this embodiment the pressure adjustment is carried out independently for the front left and right wheels, but the rear wheels are adjusted together.

If the step 104 no wheel is found to need height adjustment, processing returns to step 102, and the time counter is re-initialized to zero. In this way, the time counter counts the time which has elapsed since the vehicle height adjustment conditions came to be true and the vehicle height adjustment control was started.

Once the vehicle height adjustment control has started in step 108, processing proceeds to step 110, and a test is made as to whether the control currently being carried out is to increase or decrease the vehicle height. When the height is being decreased control proceeds to step 112, and the time counter is reset to zero. Then control proceeds to step 114, and a test is made as to whether or not the vehicle height for the vehicle wheel being controlled has reached a target value therefor. As described above, the test made in step 114 also does not simply use the vehicle height detected at that moment, but is based on the frequency of occurrence of the data over a preceding certain period. When the target vehicle height is not attained, the processing of step 108 and successive steps are repeated, and when the vehicle height falls to the target vehicle height, processing returns to step 104.

When the result of the test in step 110 is "YES", i.e. that the vehicle height increase control is being carried out, control proceeds to step 116, and a test is made as to whether or not the time counter has counted up a certain period. This certain period is determined so as to be longer than the period required for the target vehicle height to be reached if there is no trouble in the system. Therefore, if there is no such trouble, although the control process will recirculate for the time from step 116 through steps 114 and 108 and 110 to step 116, the decision in step 114 will soon become "YES" as the vehicle height reaches a target value therefor before the time counter counts up said certain period in step 116. Since the time counter is reset to zero in step 102 or 112, the time counter counts in step 116 the elapsed time since the start of the vehicle height increase control.

If there is any trouble in the vehicle height control so that the target vehicle height is not attained within a normal period set for the time counter in step 116, the time counter counts up said certain period in step 116. Then control proceeds to step 118 and the operation of the vehicle height control device is halted. In other words the compressor 10 is stopped, and the height control valves 8 and exhaust valve 12 are closed, whereby air is neither supplied to nor exhausted from the pneumatic cylinders 2. As will be understood from the above descriptions of the processing, this is executed when a certain period has elapsed from the beginning of height increase control without the target vehicle height being attained. Here the time counter is also reset, and then control proceeds to step 120.

In step 120, a test is made as to whether or not the vehicle height has reached a threshold value which is substantially higher than the target value set in step 114 for the vehicle height increase control. After adjustment control has halted, if the trouble was that the vehicle was on an uneven ground or temporarily overloaded, the vehicle height will increase at the wheel with respect to which the count up of the predetermined period occurred in step 116 as the vehicle moves out of the uneven ground or the load which caused the temporary overloading is removed. Therefore, the test made in step 120 is to check whether or not the conditions for lowering vehicle height now exist with respect to the wheel as a result of removal of the cause which suppressed the normal operation of the vehicle height control device according to steps 108, 110, 116 and 114. Wherein the processing loop consisting of steps 108, 110, 116 and 114 had been executed over the predetermined time, or, as a convenient method, the largest number of times (Such a number of repetitions may be determined by using a counter not shown in the drawings). The conditions for lowering vehicle height for compensation of the overcharging of pressurized fluid to the actuator due to the temporary cause are expected to be present within a certain period. If the answer of the test in step 120 is "NO", the test is repeated until a certain period is counted up in the next step 122.

When in step 120, before the time counter counts up the certain period in step 122, it is detected that the conditions for lowering vehicle height now exist, control proceeds to step 124. At step 124 the time counter continues to count time until a certain period elapses from the halting of the vehicle height control operation. The purpose of this time counting is to prevent the operation halting state from being terminated too soon. In other words, the vehicle height adjustment operation is prevented from restarting too soon. The operation has been halted so that the compressor 10 is cooled down and restarted in more desirable condition. Then in step 126 the operation of the vehicle height control device is restored.

If the conditions for lowering vehicle height are not present before the time counter counts up the predetermined period in step 122, control proceeds to step 128. In step 128 the vehicle height control device is finally locked up, and in step 130 an appropriate alarm is put on.

Although the description was made in the above with respect to the case that the target vehicle height is set to "medium", the target vehicle height may be set to "high" or "low" as shown in FIG. 4. For example, in the case of "high", the decision in step 104 may be whether the level is at least 10, and in step 120 the decision may be whether the level is at least 14.

Although the invention has been described in the above with respect a particular embodiment thereof, it will be understood that various modifications with respect to the shown embodiment are possible without departing from the spirit of the present invention.

We claim:

1. A vehicle height adjustment device comprising:
   an actuator disposed between a vehicle body and a vehicle wheel for raising and lowering the vehicle body relative to the vehicle wheel in accordance with pressurized fluid supplied to and exhausted from said actuator;
   fluid supply/exhaust means for selectively supplying and exhausting pressurized fluid to and from said actuator;
   vehicle height detecting means for detecting the vehicle height of the body relative to a vehicle wheel; and
   operation control means for controlling said actuator and said fluid supply/exhaust means in response to a detected vehicle height; said operation control means operating in:
   a first operational state for increasing vehicle height by actuating said fluid supply/exhaust means to supply pressurized fluid to said actuator when said detected vehicle height is less than a first target value;

a second operational state for decreasing vehicle height by actuating said fluid supply/exhaust means to exhaust pressurized fluid from said actuator when said detected vehicle height is greater than a second target value;

a halt state for halting vehicle height adjustment when said operational control means is in said first state and said detected vehicle height is less than a third target value after a first predetermined time period has elapsed, a restart state for restarting vehicle height adjustment when the detected vehicle height becomes greater than a threshold value during a second predetermined time period, and a lockup operation state for locking up said vehicle height adjustment device when the detected vehicle height remains less than said threshold value and said second predetermined time period has elapsed.

2. A vehicle height adjustment device according to claim 1, wherein in said halt state said detected vehicle height being greater than said threshold value is determined with respect to a vehicle wheel for which said first operational state has been executed the greatest number of times before entering said halt state.

3. A vehicle height adjustment device according to claim 1, wherein said threshold value is substantially greater than said third target value.

4. A vehicle height adjustment device according to claim 1, wherein in said restart state if said detected vehicle height becomes greater than said threshold value then said vehicle height adjustment device is restarted after said second predetermined time period has elapsed.

5. A vehicle height adjustment device according to claim 1, wherein said detected vehicle height is a mean vehicle height of vehicle height values detected by said vehicle height detecting means over a given time interval.

6. A vehicle height adjustment device according to claim 1, wherein said first, second, and third target values and said threshold value are determined based on whether said vehicle height adjustment device is set to maintain one of a high, medium, and low vehicle height.

* * * * *